United States Patent [19]

Reinauer et al.

[11] Patent Number: 4,768,901
[45] Date of Patent: Sep. 6, 1988

[54] DRILL HAVING TWO OR MORE CUTTING EDGES COMPRISING EXCHANGEABLE CUTTING MEMBERS

[75] Inventors: Josef Reinauer, Sigmaringen; Hans G. Kuhl, Villingen-Schwenningen, both of Fed. Rep. of Germany

[73] Assignee: Firma Gottlieb Gühring, Ebingen, Fed. Rep. of Germany

[21] Appl. No.: 31,782

[22] Filed: Mar. 30, 1987

[30] Foreign Application Priority Data

Apr. 9, 1986 [DE] Fed. Rep. of Germany ....... 3611999

[51] Int. Cl.⁴ ............................................. B23B 51/02
[52] U.S. Cl. ...................... 408/200; 407/48; 408/227; 408/231; 408/713
[58] Field of Search ............... 408/199, 200, 227, 230, 408/231, 233, 713; 407/47, 48, 102, 103, 104

[56] References Cited

U.S. PATENT DOCUMENTS

| | | | |
|---|---|---|---|
| 1,314,690 | 9/1919 | Nagle | 407/47 |
| 2,407,501 | 9/1946 | Kraus | 407/48 |
| 2,852,969 | 9/1958 | Piha et al. | 408/200 |
| 2,865,572 | 12/1958 | Lannert | 407/48 |
| 4,231,691 | 11/1980 | Pape et al. | 408/185 |
| 4,367,991 | 1/1983 | Grafe et al. | 408/224 |
| 4,461,602 | 7/1984 | Zettl | 407/48 |
| 4,566,828 | 1/1986 | Reinauer | 408/713 |

FOREIGN PATENT DOCUMENTS

| | | | |
|---|---|---|---|
| 1221526 | 7/1966 | Fed. Rep. of Germany | 408/233 |
| 3402547 | 8/1985 | Fed. Rep. of Germany | 407/104 |
| 8605729 | 10/1986 | PCT Int'l Appl. | 408/199 |

*Primary Examiner*—Gil Weidenfeld
*Assistant Examiner*—Daniel W. Howell
*Attorney, Agent, or Firm*—Oblon, Fisher, Spivak, McClelland & Maier

[57] ABSTRACT

A drill having two or more cutting edges is provided with interchangeable cutting members. The cutting members are fastened by screws in corresponding recesses formed in the drill bit. The cutting members are embodied by interchangeable plates and provided with fastening portions behind the main cutting edge, in the direction of cutting. The screws engage through these fastening portions in threaded bores formed in the front face of the drill bit.

6 Claims, 1 Drawing Sheet of the interchangeable plate lies in a radial plane of the drill, contrary to the known state of the art.

By virtue of the symmetrical design of a plurality of cutting members mounted at the drill bit, the drill is a self-centering and self-guiding tool permitting relatively great drilling depths to be cut which may go up to ten times the diameter of the cutting tool. Furthermore, the symmetrical design results in symmetrical loading of the tool. This leads to high quality of the work, not only as regards the accuracy of the diameter drilled, but also the characteristic of the surface cut. For optimum removal of the chips, the cutting members may have almost any desired geometry (positive rakes, chip directing steps, chip parting flutes). The geometry can be adapted to the material to be machines. Because of the symmetrical arrangement, high feeding speeds can be realized for the drill. The cutting members can be reground sufficiently often, especially so if wear-resistant materials such as hard metal or the like are being used.

The design of the fastening portions makes it easier to align the cutting member at the drill bit and warrants that the cutting member and the drill bit are firmly coordinated in space. Full form lock is obtained with a flux of force which is both uniform and defined.

A design of the round chamfer and/or secondary cutting edge adapted in the best possible manner to the geometry of the cutting edges is permitted by the resulting small axial extension of the interchangeable plate.

DRILL HAVING TWO OR MORE CUTTING EDGES COMPRISING EXCHANGEABLE CUTTING MEMBERS

FIELD OF THE INVENTION

The invention relates to a drill having two or more cuttings edges, comprising exchangeable cutting members which are fastened by screws in corresponding recesses formed in the drill bit.

BACKGROUND OF THE INVENTION

Boring tools are known, comprising drill bits to which interchangeable turnover plates are fastened which are formed with the main cutting edges. These turnover plates are fastened to the drill bit by screws extending with their axes approximately in a radial plane of the drill bit and passing approximately through the center of the turnover plates.

This manner of fastening gives the turnover plate a rather great length in the direction of advance of the drill, and this may lead to disturbance in the discharge of the chips. With these known turnover plate drills, it belongs to the state of the art to have an asymmetrical arrangement of one, two, or more turnover plates, which provides for dividing the cut of the total cross section to be cut. This division of the cut makes it impossible for the drill to self-center and guide itself. As a consequence, such drills usually can be used only for drilling depths up to three times (in exceptional cases up to five times) the diameter of the boring tool. It is always only one cutting edge which produces the drilling diameter.

The great structural length in feeding direction at 0° cutting angle sets rather insufficient narrow limits for the possibilities of chip formation by corresponding selectable geometries. Therefore, ideal conditions as to the cutting edge geometry for any material to be machined exist in rare cases only.

OBJECT OF THE INVENTION

It is, therefore, an object of the instant invention to develop the concept of the drill as recited in the preamble such that a symmetrical arrangement of two or more cutting members will provide self-centering and self-guiding of the drill. This permits greater drilling depths and, at the same time, improves the quality of the cuts made.

SUMMARY OF THE INVENTION

This object is met, in accordance with the invention, in that the cutting members are designed as interchangeable plates having fastening portions behind the main cutting edge in the cutting direction, the screws engaging through said fastening portions in threaded bores formed in the front face of the drill bit.

The provision of the threaded bore in the front face of the drill web not only facilitates the sinking of the bore in the drill bit, but also makes sure that the cutting members can be designed more freely. The geometry of the cutting members influencing the cutting operation can be designed almost without any limitation so that improvements are possible particularly in the range of the transverse cutting edges which may reach as far as the center of the core of the drill without, thereby, reducing the service life or the load which the drill can take. In the final analysis, this free design of the cutting edges is obtained by the fact that the principal extension

BRIEF DISCRIPTION OF THE DRAWINGS

The invention will be described further, by way of example, with reference to the accompanying drawings, in which.

DETAILED DESCRIPTION OF THE PRESENTLY PREFERRED EMBODIMENTS

Figure 1:
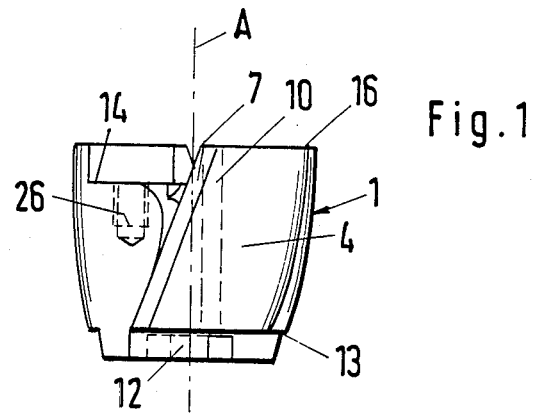
FIG. 1 is a side elevation of the drill bit according to the invention.
Figure 2:
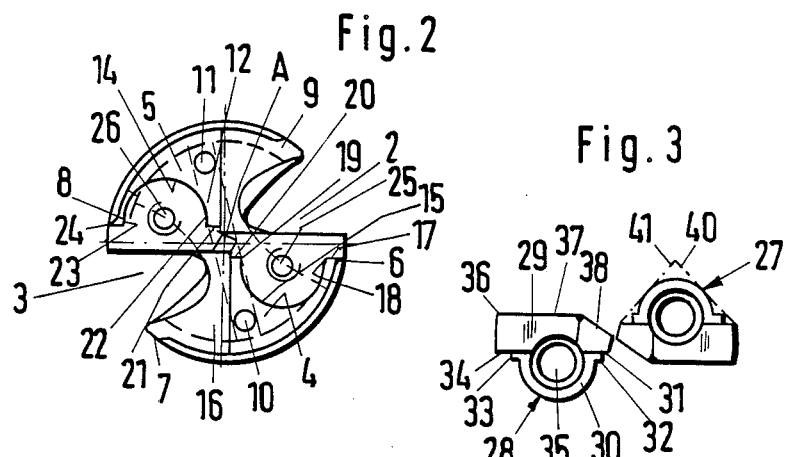
FIG. 2 is a view of a first embodiment of the front face of the drill bit.

A drill bit 1 shown in FIGS. 1 and 2 belongs to a twist drill having two flutes 2, 3 between which drill webs 4, 5 are formed. At their edges defining the flutes 2, 3, the webs 4, 5 are provided with guide chamfers 6, 7, 8, 9 intended to center the twist drill within a bore hole. Coolant passages 10, 11 communicating with a transverse connecting passage 12 extend through the drill webs 4, 5, the transverse connecting passage 12 itself communicating with a coolant supply formed in the spiral or carrier member (not shown). Coolant is supplied to the bottom of the bore hole through the coolant passages 10, 11 which extend outside of the core of the twist drill in the webs 4, 5 of the drill. The drill bit 1 is formed in its end to be connected to the cutting member with a radial step 13 extending along the outer circumference of the drill webs 4, 5 and serving to facilitate and make firmer the attachment to the spiral member.

At its front face 16 facing the bottom of the bore hole, the drill bit 1 is formed with two recesses 14, 15 arranged symmetrically with respect to the drill axis A. At their side arranged at the leading edge of the drill web 4 and 5, respectively, the recesses 14, 15 extend in radial direction, covering approximately one full radius. At their portions close to the drill axis A (i.e., at the core of the twist drill), they merge into each other. Further parts of the recesses 14, 15 extend from the backsides of these radially extending portions of recesses 14, 15, passing in semicircles into the portions formed by the drill webs 4, 5 of the front face 16 of the drill bit 1. The curvature of the delimiting walls begins after a short straight starting portion only. The diameter of the semicircular parts of the recesses is a little smaller than those parts of the recesses 14, 15 extending along the leading edges of the drill webs 4, 5. In this manner, each recess 14, 15 has two corners, each defined by two planar wall portions 17, 18, 19, 20, 21, 22, 23, 24 aligned parallel to the drill axis A. A threaded bore 25, 26 is formed in each recess 14, 15 approximately in the central portion of the diameter of the semicircle.

Figure 3:
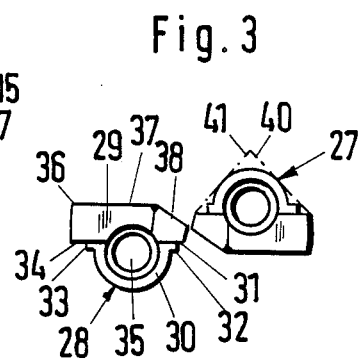
FIG. 3 is a top plan view of the cutting members according to the invention, one cutting member being represented by a continuous line with a semicircular fastening portion and by a dash-dot line with a prismatic fastening portion.
Figure 4:
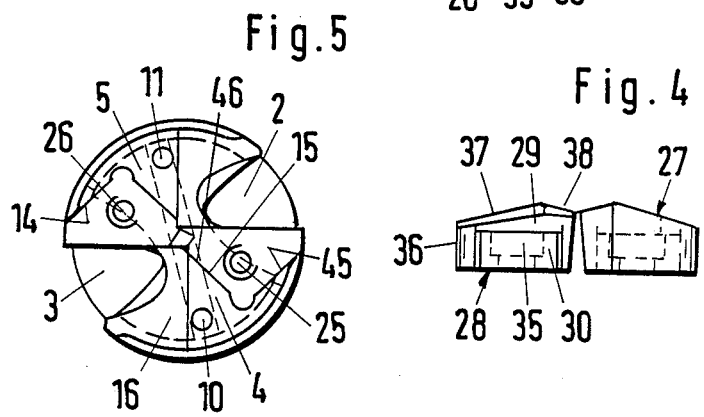
FIG. 4 is a side elevation of the cutting members having round fastening portions.

Cutting members 27, 28 are inserted in the recesses 14, 15. They are embodied by interchangeable plates and are shown in FIGS. 3 and 4. The interchangeable plates 27, 28 are of identical design so that only interchangeable plate 28 will be described further below with reference to the associated recess 14. The interchangeable plate 28 substantially is divided into two portions:

a cutting portion 29 and
a fastening portion 30.

The cutting portion 29 is disposed within the recess 14 near the leading edge of the drill web 5, while the fastening portion 30 is located in the semicircular part of the recess 14 formed behind the same, as seen in the direction of rotation of the twist drill. At its delimiting surface engaging the basic surface of hte recess 14, the interchangeable plate 28 has an outline similar to that of the recess 14. However, the diameter of the semicircular fastening portion 30 is a little less than that of the corresponding part of the recess 14 so that the interchangeable plate 28 does not engage the opposite wall portion of the recess 14 by the curved, semicylindrical wall portion of its fastening portion 30. This makes it unnecessary to observe the accuracy of the diameters in manufacturing the semicircular portions which are difficult to make, not only as regards the recess 14 but also as regards the fastening portion 30 of the interchangeable plate 28. The fixed arrangement in space of the interchangeable plate 28 within the recess 14 is obtained by planar fitting surfaces 31, 32, 33, 34 oriented in parallel with the drill axis A and being in direct engagement with the complementary planar wall portions 21, 22, 23, 24 of recess 14. At the part of the fastening portion 30 projecting into the semicircular part of the recess 14, the thickness of the interchangeable plate 28 is selected such that it will be aligned with the section formed by the drill web 5 of the front face 16 of the drill bit 1. Furthermore, a through bore 35 is formed in the fastening portion 30 and arranged such that it will be aligned with the threaded bore 26 formed in the bottom of the recess 14 when engagement has been established between the planar fitting surfaces 31, 32, 33, 34 and the planar wall portions 21, 22, 23, 24. The interchangeable plate 28 is fixed in the recess 14 by means of a screw which passes through the through bore 35 and is screwed into the threaded bore 26. Consequently, the interchangeable plate 28 is fixed both in axial and radial directions of the twist drill, being firmly coordinated in space with the drill bit 1.

Figure 5:
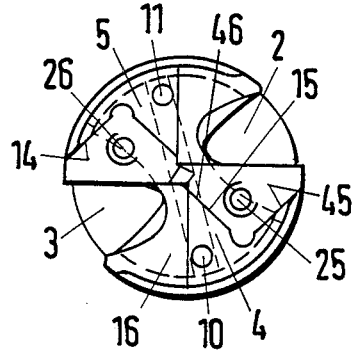
FIG. 5 shows a second embodiment of the front face of the drill bit.

As shown for the interchangeable plate in FIG. 3, the fastening portion 30 also may have the shape of a prism, including fitting surfaces 40, 41. In the case of interchangeable plates 27 of this type, the front face 16 of the drill bit 1 is formed with corresponding wall portions 45, 46, as shown in FIG. 5.

At its side portion arranged at the circumference of the drill bit 1, the cutting portion 29 of the interchangeable plate 28 is ground such that it continues the guide chamfer 8 of the drill bit 1 in a direction toward the bottom of the bore hole. In this manner; better guidance of the twist drill is assured inside the bore hole as well as exact self-centering. Furthermore, the exterior front edge of the this part of interchangeable plate 28 extending approximately parallel to the drill axis A is ground such that it presents a secondary cutting edge 36 which makes drill bit 1 longer. The lower front edge of the interchangeable plate 28, as seen in the direction of rotation of the twist drill, presents a main cutting edge 37 of the drill bit 1 in its main section which extends from the circumference approximately to the outer edge of the core of the drill. The main cutting edge 37 is inclined such that its end portions facing the core of the drill projects in the direction toward the bottom of the bore hole. The main cutting edge 37 ends and a transverse cutting edge 38 begins approximately at the outer circumference of the core of the drill. The transverse cutting edge 38 is oriented from the inner end of the main cutting edge 37 approximately to the center of the core of the drill and inclinded with respect to a radial plane of the twist drill such that, together with the main cutting edge 37 it presents a tip protruding in the direction of the bottom of the bore hole. In a crosscut plane of the drill bit 1, the transverse cutting edge 38 is approximately aligned with the corresponding transverse blade formed at the other interchangeable plate. Together with the main cutting edge 37, the transverse cutting edge 38 presents a tip which protrudes in the direction of the bottom of the bore hole and towards the front, as seen in the direction of the twist drill.

The planar fitting surfaces 31 and 34 of the interchangeable plate 28 need not be aligned, and this is true also of the planar wall portions 21 and 24 of the recess. Moreover, the fastening portion of the interchangeable plate 28 may be designed other than so as to be semicircular in shape. The threaded bores in the webs of the drill may be displaces a little backwards, as seen in the direction of rotation of the twist drill, or they may be given a chamfering angle so as to warrant full engagement between the fitting surfaces 31 and 21 or 34 and 24, respectively.

The invention thus provides a drill having two or more cutting edges and comprising exchangeable cutting members. The cutting members are fastened by screws in corresponding recesses formed in the drill bit. The cutting members are embodied by interchangeable plates and are provided with fastening portions behind the main cutting edge, as seen in the cutting direction. The screws pass through these fastening portions to engage in threaded bores formed in the front face of the drill bit.

What is claimed is:

1. A drill comprising:
   (a) a drill bit having a drill axis about which said drill bit is rotated during use, a front face, a plurality of recesses formed in said front face, and a threaded bore extending from each one of said plurality of recesses in parallel to said drill axis;

(b) a plurality of exchangeable cutting members, each one of said plurality of exchangeable cutting members comprising a cutting portion having a cutting face and a fastening portion sized and shaped to be closely received in a corresponding one of said plurality of recesses, each one of said fastening portions being located behined the cutting face of the corresponding cutting portion and having a through hole therethrough sized, shape, and positioned so that, when said each one of said fastening members is received in a corresponding one of said plurality of recesses, its through hole is in registry with the one of said threaded bores in the corresponding one of said plurality of recesses and the cutting face of the corresponding cutting portion is located forward of the corresponding one of said threaded bores; and (c) a plurality of screws, each one of said plurality of screws passing through a corresponding one of said plurality of through holes and being threaded into a corresponding one of said plurality of threaded bores.

2. A drill as recited in claim 1 wherein said plurality of exchangeable cutting members are of identical design.

3. A drill as recited in claim 1 wherein each one of said fastening portions is, in part, semicircular in shape in planes perpendicular to said drill axis.

4. A drill as recited in claim 1 wherein each one of said fastening portions is, in part, prismatic in shape in planes perpendicular to said drill axis.

5. A drill as recited in claim 1 wherein:
(a) each one of said fastening portions has a plurality of planar fitting surfaces extending at least substantially parallel to said drill axis;
(b) each one of said plurality of recesses has a plurality of planar wall portions extending at least substantially parallel to said drill axis; and
(c) when each one of said fastening portions is received in a corresponding one of said plurality of recesses, each of said plurality of planar fitting surfaces is in surface abutting contact with a corresponding one of said plurality of planar wall portions.

6. A drill as recited in claim 5 wherein a plurality of adjacent pairs of said plurality of planar fitting surfaces extend at right angles to each other.

* * * * *